(12) United States Patent
Pekarsky (10) Patent No.: US 9,012,852 B2
(45) Date of Patent: Apr. 21, 2015

(54) EXPLOSIVES DETECTOR

(75) Inventor: Gregory Pekarsky, Egg Harbor City, NJ (US)

(73) Assignee: Battelle Memorial Institute, Columbus, OH (US)

( * ) Notice: Subject to any disclaimer, the term of this patent is extended or adjusted under 35 U.S.C. 154(b) by 978 days.

(21) Appl. No.: 12/302,673

(22) PCT Filed: May 30, 2007

(86) PCT No.: PCT/US2007/012705
§ 371 (c)(1),
(2), (4) Date: Nov. 26, 2008

(87) PCT Pub. No.: WO2008/105784
PCT Pub. Date: Sep. 4, 2008

(65) Prior Publication Data
US 2009/0114834 A1 May 7, 2009

Related U.S. Application Data

(60) Provisional application No. 60/809,498, filed on May 31, 2006.

(51) Int. Cl.
*G01V 5/00* (2006.01)

(52) U.S. Cl.
CPC .................. *G01V 5/0008* (2013.01)

(58) Field of Classification Search
CPC ..................................................... G01V 5/0008
USPC ......................................... 250/360.1; 376/159
See application file for complete search history.

(56) References Cited

U.S. PATENT DOCUMENTS

| | | | | |
|---|---|---|---|---|
| 3,463,922 | A | * | 8/1969 | Prudencio, Jr. et al. . 250/363.01 |
| 5,162,095 | A | * | 11/1992 | Alegre et al. ................. 376/159 |
| 5,982,838 | A | * | 11/1999 | Vourvopoulos ............... 376/159 |
| 2001/0046274 | A1 | | 11/2001 | Craig et al. |
| 2003/0152186 | A1 | * | 8/2003 | Jurczyk et al. ................ 376/109 |
| 2003/0165212 | A1 | * | 9/2003 | Maglich ........................ 376/156 |
| 2006/0093087 | A1 | * | 5/2006 | Procter ............................ 378/57 |

FOREIGN PATENT DOCUMENTS

| | | |
|---|---|---|
| EP | 336 634 | 10/1989 |
| GB | 1163515 | 9/1969 |
| WO | WO 91/11010 | 7/1991 |

\* cited by examiner

*Primary Examiner* — David Porta
*Assistant Examiner* — Shun Lee
(74) *Attorney, Agent, or Firm* — Diederiks & Whitelaw, PLC (57) ABSTRACT

Apparatus and methods for determining the absence or presence of contraband in an object with a fast neutron source for irradiating the object; a detector for measuring γ-rays emitted by the irradiated object from energy state relaxation as a result of neutron capture, typically after the object has been irradiated.

9 Claims, 7 Drawing Sheets

EXPLOSIVES DETECTOR

This application claims the benefit of U.S. Provisional Application Ser. No. 60/809,498, Explosives Detector, filed May 31, 2006.

FIELD OF THE INVENTION

The invention includes novel apparatus and methods for detecting of threats (explosives, contraband, car bombs, mines, etc). The invention is useful in transportation, in the military, in protecting property, and generally protecting the public from accidents and intentional acts, such as terrorist acts.

BRIEF DESCRIPTION OF THE INVENTION

Neutron irradiation of specific targets and simultaneous identification of prompt secondary radiation from those targets have long been used for identification of specific elements and ratios of different elements present in the target (industrial elemental analysis, defects detection, mines and explosives detection, etc). Prompt secondary radiation from neutron irradiation can have several different forms: elastic or inelastic scattered neutrons; γ-rays from the inelastic scattering event; and γ-rays from energy state relaxation as the result of a neutron capture event. The ability to detect specific elements, and ratios of elements, provide a positive means to detect nuclear, chemical, biological and explosive material within the target of interest (e.g. suitcases, luggage, cargo, mines, unexploded ordinance (UXO), and vehicles). However, the main disadvantage of the existing technologies, based on the registration of prompt secondary radiation, is low a ratio of signal to background.

The low signal to background ratio is caused by the simultaneous registration of two inputs in the detector reading (i.e. overlapping "background" and "signal"): (1) all types of radiation related to the primary irradiation (background); and (2) all prompt secondary radiation (both background and signal). The presently disclosed technology allows a significant increase in the signal to background ratio, and as a result, provides for significantly enhanced detection characteristics (e.g. increased reliability of detection, decreased false alarms, increased stability to presence of clutters, decreased minimum detectable mass of explosives). This methodology is extremely robust and characteristically has a high level of confidence for detection with simultaneous low probability of false detection.

The practical application of neutron based detection methodologies, as with any other type of detection technology, is highly dependent upon separating the desired signal, "S", from the background "B". The background corresponds to detector reading with no measured distortion (mines, contraband, and explosives) present. This background has several different components: direct neutrons and gamma rays (if present) from the source used for irradiation, scattered gamma rays and neutrons (using gamma-detectors are sensitive to the fast and thermal neutrons), and secondary prompt γ-rays from both direct radiation and scattered events. The background can be quite high making it difficult to extract the true signal, i.e. change in detector reading because of threats (contraband) presence during the interrogation event. Optimization of any technology based on statistical measurements must be done by maximization not the ratio signal S to the background B, but by maximization of the ratio $\Delta S$ (signal increment) to the standard deviation in the background, D, i.e. $\Delta S/D$. This criterion includes such important parameters of practical realization as source output, detector(s) efficiency and time of measurement.

Several standard methodologies are used currently to decrease the background noise and make it easier to discriminate between signal and noise for the technologies based on the prompt secondary radiation detecting. These include: large amounts of screening material for absorption direct source radiation on the line-of-sight between the detector and possible background sources, beam collimation to focus both source and secondary radiation, pulsed technologies where the source is pulsed at a known frequency and signal detection occurs between pulses, and special detection technologies such as "time-of-flight" and associated particle imaging. These technologies demand more sophisticated and powerful sources (larger, heavier, more complicated, expensive and less reliable); larger sets of special detectors with fine time resolution; large and heavy protection; high speed electronics; large distance for the time-of flight technology; special approaches and programs for processing the data. Therefore, they are not easily portable and usually require significant maintenance and upkeep are more complicated and not mechanically and electronically reliable.

A broad embodiment of the apparatus for detecting a material in an object includes a neutron source for irradiating the object; a detector for measuring induced γ-rays emitted by the irradiated object from energy state relaxation as a result of neutron capture; and a controller for controlling the neutron source and detector with a timer for controlling a measurement event in the detector. The apparatus typically has a display for indicating to a user the absence or presence of a material in the object.

An additional broad embodiment of the invention provides for apparatus for detecting a material in an object including a neutron source for irradiating the object; a detector for measuring induced γ-rays emitted by the irradiated object from energy state relaxation as a result of neutron capture; a conveyor for moving the object from an irradiation site to a detection site; and a controller for controlling the neutron source and detector with a timer for controlling a measurement event in the detector. The apparatus typically has from one to a plurality of neutron sources and from one to a plurality of detectors.

A further broad embodiment of the invention provides for a method for detecting contraband including the steps of irradiating an object with neutrons; measuring induced γ-rays emitted by the irradiated object from energy state relaxation as a result of neutron capture after a time delay when the object has been irradiated; and determining if the measured γ-rays emitted by the irradiated object are indicative of contraband. Typically an operator is alerted by the apparatus of the presence or absence of an item of interest such as contraband or an explosive. The irradiated object is typically moved to a detection area prior to measuring the induced γ-rays emitted by the irradiated object and more than one irradiated object may be in a detection area at the same time for measurement of induced γ-rays.

DETAILED DESCRIPTION OF THE INVENTION AND BEST MODE

Broadly, fast neutron induced spectrometry is designed to maintain fast throughput, high probability of detection and low probability of false detection. A fast neutron source is used to irradiate the object being tested for threat, this is the irradiation block. Irradiation of the test object is then stopped and the object is shunted to a detection block. Separation in space and time of irradiation and detection significantly reduces the background count thereby increasing the signal to noise ratio, i.e. increasing reliability of detection and decreasing false alarm rate. Additional advantage of the technology is decreasing of clutter influence on treat detection. The clutter (any item that can cause false alarm or mask the desired element signal by an overlapping signal) can be removed by utilizing the different decay rates of the irradiated elements. For example, it is possible that iron and copper could screen or clutter a signal from nitrogen, which is present in all explosives. However, the decay rate for copper and nitrogen are different, and by selecting an appropriate time of irradiation and waiting an appropriate time period before beginning detection and choosing an appropriate length of time for signal detection, the nitrogen signal can emerge from the copper clutter.

The normalized iron signal is relatively weaker than the desired nitrogen signal. In spite of this, with previous methods large amounts of iron could screen a possible nitrogen signal. Again, the decay constant for the appropriate materials and the ratios of the different signal strengths for iron can be used to unmask the nitrogen signal, effectively increasing the signal to noise ratio of the system. Other advantages of fast neutron induced spectrometry are typically obtained by using simple, reliable sources and detectors.

Fast Neutron Induced Spectrometry for non-intrusive/non-destructive detection of threats is robust, simple, reliable and highly accurate. The key technical aspect is that the irradiation process and the detection process are separate in time, that is they are performed at different times. This makes it possible to essentially totally remove the main part of background noise from the detection scenario. Additional key aspects are the unique elemental dependence of the decay constant, i.e. different decay constants for nitrogen as compared to other elements (iron, copper, etc), and the use of simple sources and detectors for irradiation and detection.

Fast neutrons are used to irradiate the object being tested. The fast neutrons from most accelerating sources have energies that exceed the element activation energy for the desired element, e.g. 14 MeV for $N^{14}$ found in explosives ($N^{14}$ has an activation energy of 10.553 MeV). The activity at time t, A(t), for any element can be written as $$A(f) = f\sigma N(0)[1 - e^{-\lambda t}]$$

where $\sigma$ is the activation cross-section, f is the neutron flux at the element location, N(0) is the amount of the element present at time t=0, and $\lambda$ is the radioactive decay constant, $$\lambda = 0.6937/T^{1/2}$$

where $T^{1/2}$ is the radioactive half-life of the element. Half-lives for several elements of interest are shown (along with energy of the induced secondary γ-rays and the relative signal strength for $3T^{1/2}$ activation time) in Table 1.

TABLE 1

Induced radiation from the most threats and background elements for fast neutron irradiation.

| Element | Energy of induced secondary γ-rays (MeV) | Relative Signal Strength for corresponding Energy and time of activation $3\,T^{1/2}$ | Half-life time $T^{1/2}$ (min) |
| --- | --- | --- | --- |
| Hydrogen | No | — | — |
| Carbon | No | — | — |
| Nitrogen | 0.511 | 0.8 | 9.96 |
| Oxygen | >6 | 1.2 | |
| Iron | 0.511 | 0.09 | 8.5 |
| | 0.117, 0.134 | 0.6 | 1.75 |
| | 0.845 | 1.6 | 155 |
| Silicon | 1.78 | 1.2 | 2.31 |
| | 1.28 | 0.8 | 6.56 |
| Sulfur | 2.13 | 0.7 | 0.2 |
| Aluminum | 0.834 | 0.09 | 10 |
| | 1.37 | 1.4 | 900 |
| Calcium | 1.29 | 0.4 | 108 |
| Sodium | 0.44 | 0.06 | 0.62 |
| | 1.63 | 0.5 | 0.19 |
| Copper | 0.511 | 1.8 | 773 |
| | 1.17 | 0.08 | 13.9 |

Once irradiation has ceased, secondary induced γ-rays are emitted from the excited nucleus. The activity of the secondary γ-rays is given by $$A(t) = \lambda N(t_{\mathit{eff}}) e^{-\lambda t}$$

where $N(t_{\mathit{off}})$ is the amount of excited (irradiated) element present when the neutron flux is terminated. The density of the induced secondary γ-rays, at a distance "r" measured from the threat to the detector is $$D = A(t)/4\pi r^2$$

Figure 1:
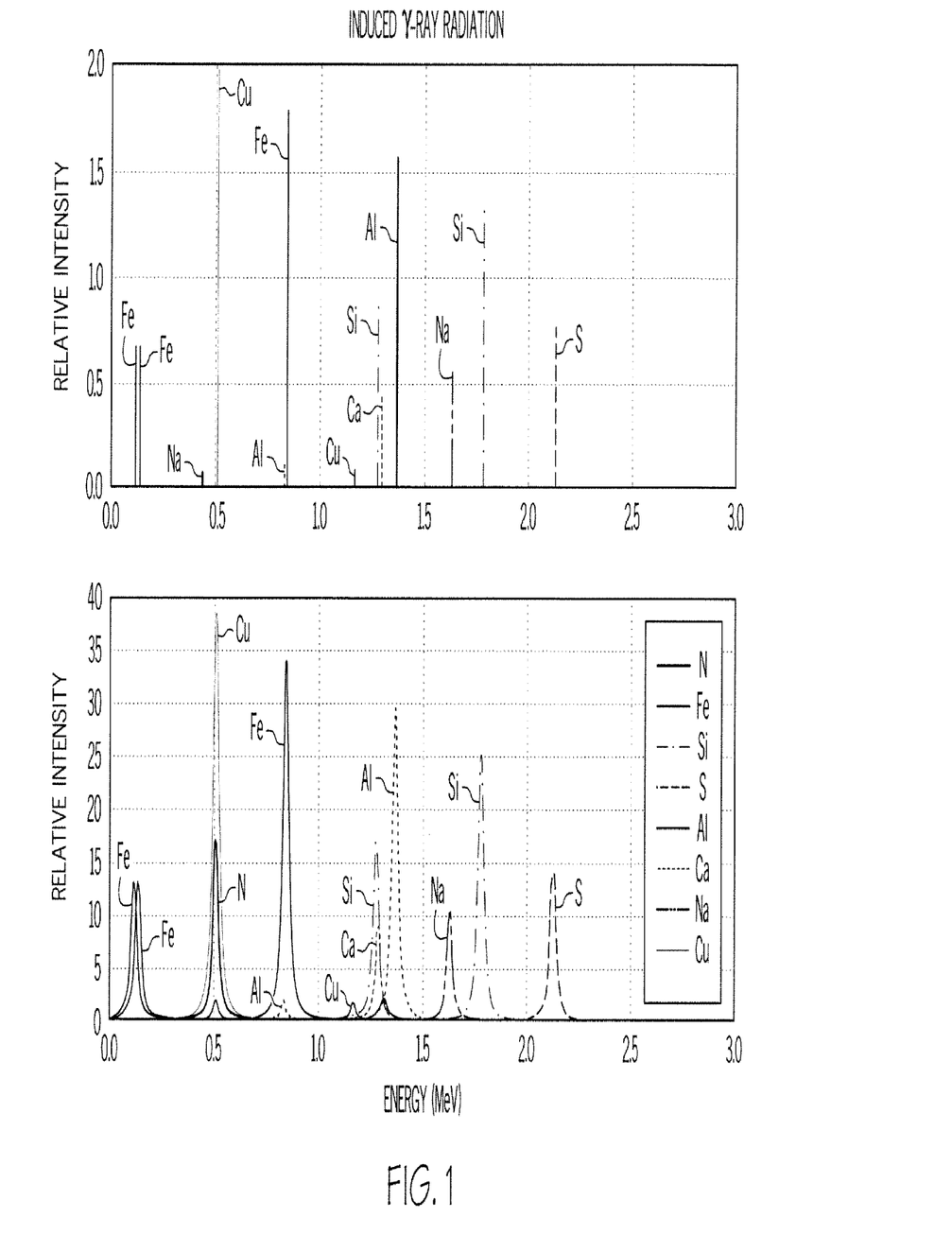
FIG. 1 is a graph illustrating the spectrum of induced secondary γ-rays for the given elements (explosives, background, and clutter). The upper plot is theoretical and the bottom plot shows Lorentzian broadening of the spectrum by 6%, calculated from the $\Delta S/D$ characteristics of the detection system. The horizontal axis shows Energy in MeV and the vertical axis is in relative intensity.

Nitrogen is the common element of all explosives that can be excited in this manner. It is noted from Table 1 that the energy of the induced secondary γ-rays for nitrogen have energy of 0.511 MeV. However, several elements (copper iron) also have induced secondary γ-rays with the same energy, which can mask the detection of nitrogen. FIG. 1 shows the induced secondary spectrum for the above elements. However, the decay constants for these elements are unique to those elements, and therefore is different for each element. This difference can be exploited by selecting an appropriate time for irradiation, waiting an appropriate time before registering the induced secondary γ-rays, and selecting appropriate time for signal detection, Such a flexible approach with three different variables permits a significant increase in the ratio signal to background even when masking elements are present in the tested object.

The difference between the decay constants for copper and nitrogen are significantly different and therefore, despite the relative high intensity of the copper line at 0.511 MeV, the saturation time is so long that using the present invention of only registering secondary γ-rays after terminating the neutron flux means that the copper signal will not mask the nitrogen signal, if nitrogen is present.

The decay constant of iron and nitrogen, while different are much closer than that of copper and nitrogen. However, the present invention provides a third method for discriminating clutter: using the existing (for any element) additional energy range's for clutter's secondary radiation and their unique decay constant. For example, referring again to FIG. 1, to discriminate between the iron and the nitrogen signal one can compare energy line strength ratios for the other range of iron secondary induced radiation (energy lines) (the doublet at 0.117/0.135 MeV and the line with energy of 0.845 MeV) to infer the signal strength of the iron line at 0.511 MeV (besides using time delayed discrimination for 0.511 MeV: wait a sufficient time for the iron energy line to decay and unmask the nitrogen signal). Because the decay constant for iron is less than that of nitrogen, the iron line will saturate at a higher rate than the nitrogen line. However, this also means that the iron line will decay at a faster rate than the nitrogen line.

Figure 2:
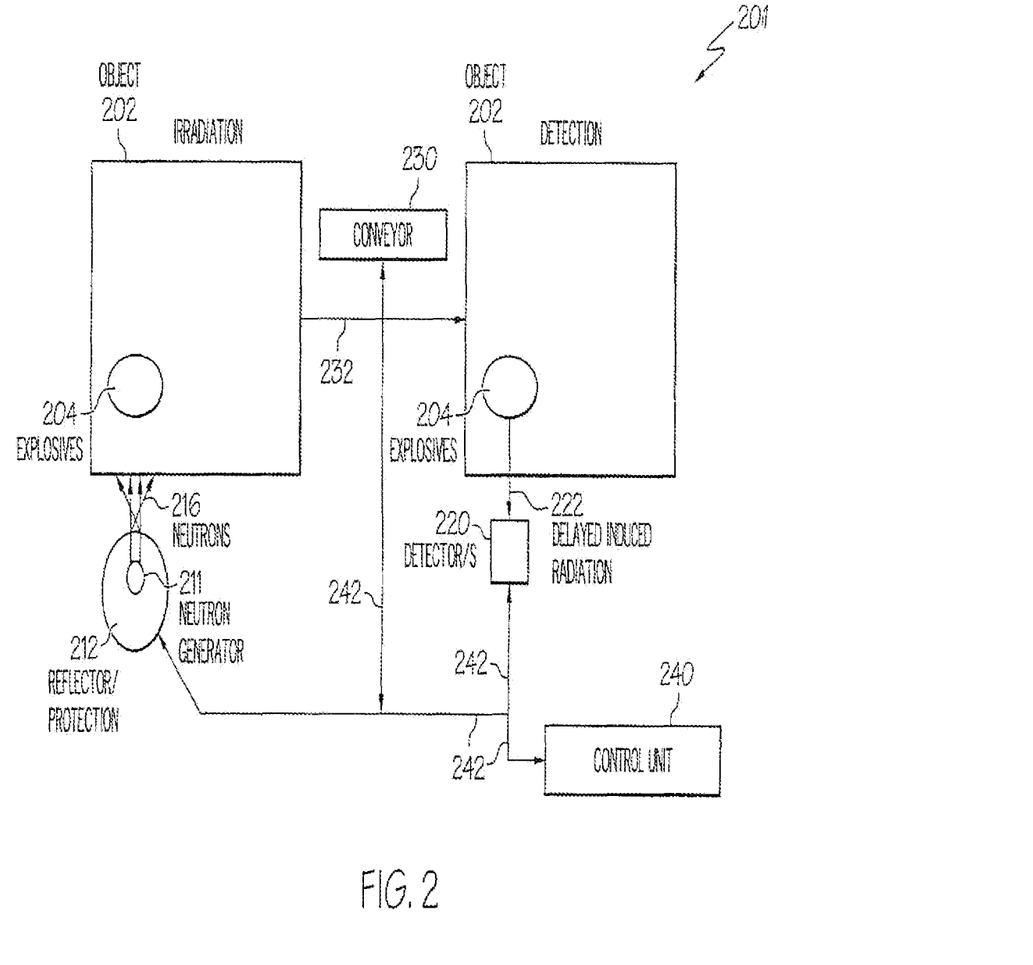
FIG. 2 is a schematic of one embodiment of the invention where contraband (an explosive) is within an object that is tested.

Referring now to FIG. 2, this figure is a schematic showing one embodiment 201 of the invention. An object 202 to be tested contains contraband such as an explosive 204. The object 202 is irradiated with neutron generator 211 where an optional reflector 212 aids in the process. Fast neutrons 216 are generated for scanning the object 202. After irradiation a conveyor 230 moves the object 202 in direction 232 to a detection area where a detector 220 detects induced gamma radiation 222 from the object 202 and explosive 204 within the object 202. Data is communicated to control unit 240 and received at the neutron generator 211, detector 220, and converter 230 by interconnecting wires or cables via wireless transmission 242.

Figure 3:
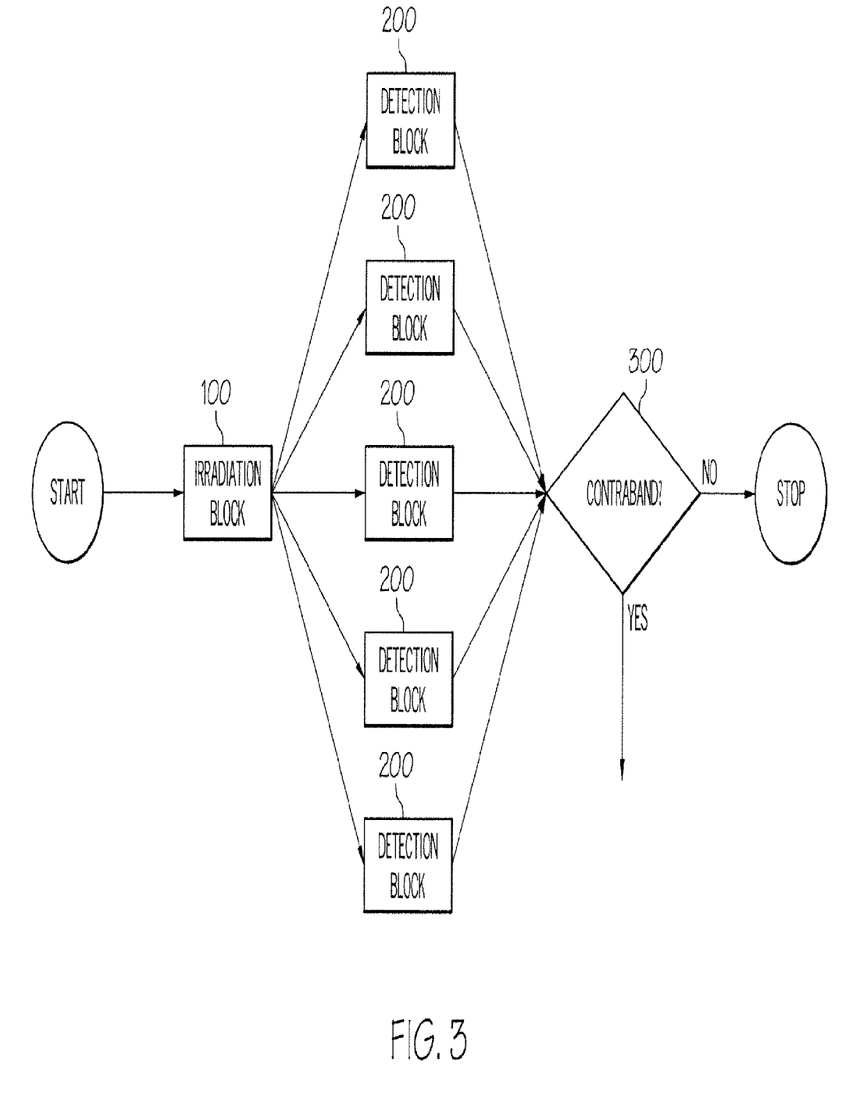
FIG. 3 is a schematic diagram illustrating how several detection is blocks can be tied to a single irradiation block in order to increase system throughput.

Typical irradiation times for this system are on the order of a few seconds to a few minutes (for different explosive mass, depth of location, type of checked object, etc.). This waiting time can significantly impact the throughput of this system. However, because only very simple detectors are required for this system, several detection blocks can be linked to one irradiation block, see FIG. 3. As FIG. 3 shows, an object can be irradiated in the irradiation block 100 and sent to one of a plurality of detection blocks 200 where the object in the block can be interrogated at the proper time to determine the absence or presence of a material in the object. The determination is then made by a computer, calculator 300 or the like as to whether the object contains contraband or other materials of interest, if no the object passes, if yes it fails the test.

Figure 4A:
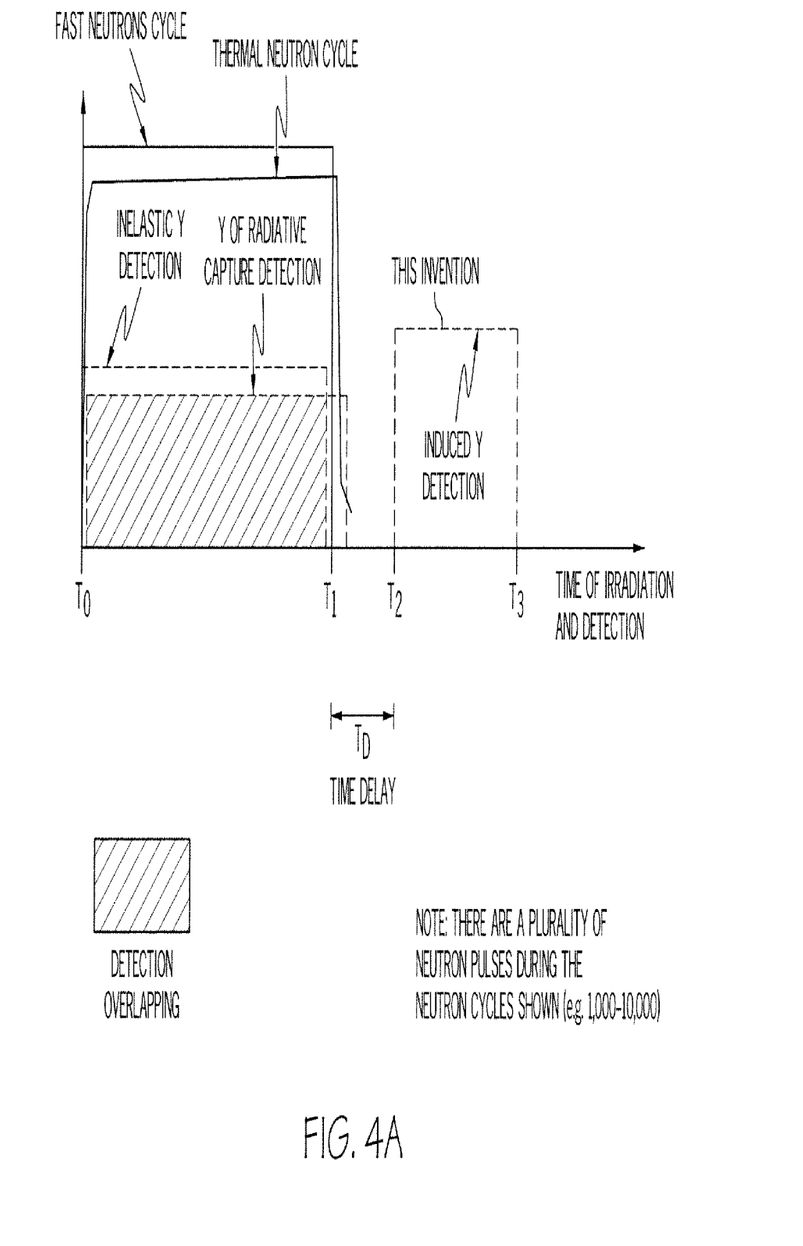
FIG. 4A is a graph showing a general time diagram of detection by registration of prompt secondary gamma radiations (currently used PFNA, pulsed fast thermal neutron analysis (PFTNA) and the present invention that uses delayed induced gamma radiation (TDSNIR). The vertical scale is relative magnitude of the different responses due to neutron irradiation, and the horizontal scale is time in relative magnitude after irradiation with neutrons.
Figure 4B:
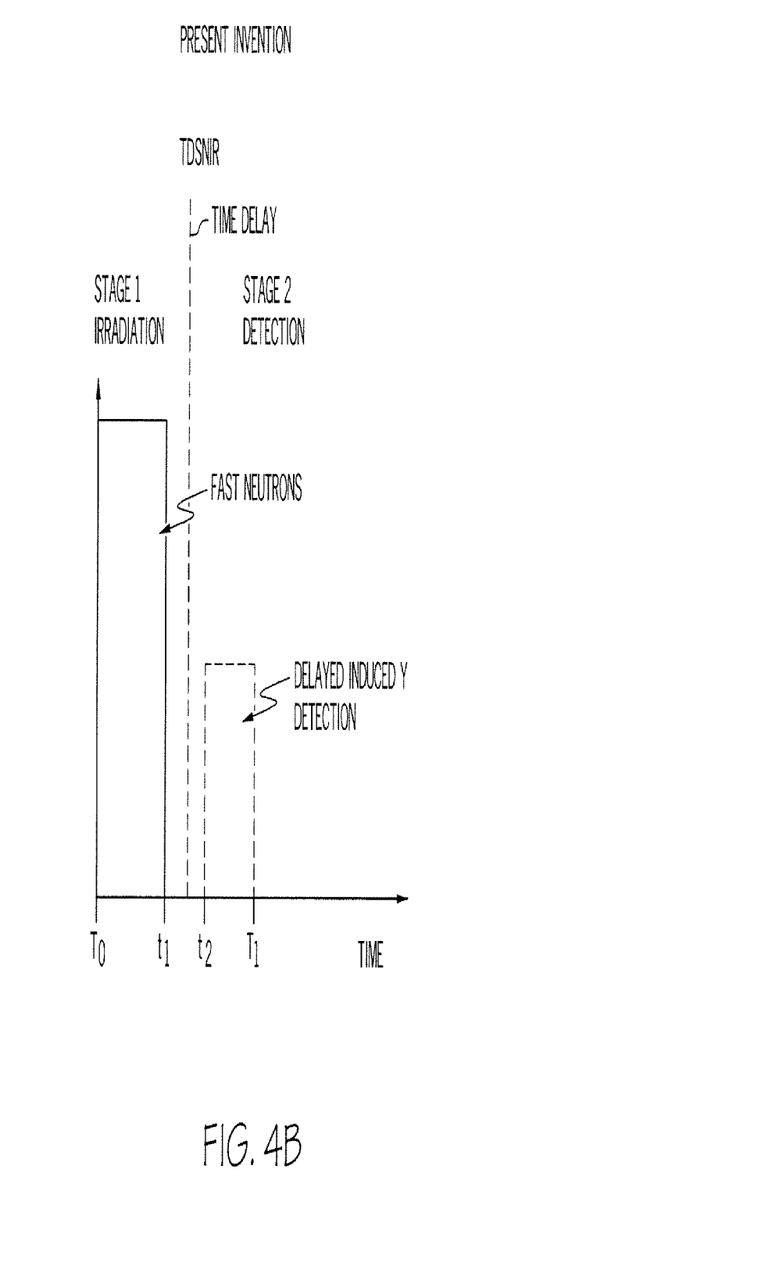
FIG. 4B is a graph showing a general time diagram of irradiation and detection. Stage 1 is irradiation and Stage 2 is detection. Fast neutrons irradiate a test object and after a selected time delay induced gamma radiation produced by the fast neutrons is measured. The vertical scale is relative magnitude of the different responses due to neutron irradiation, and the horizontal scale is time in relative magnitude after irradiation with neutrons.

Referring now to FIG. 4A, this figure illustrates the main difference between existing approaches and the approach of the present invention. The prior art to the left measures overlapping pulses as discussed elsewhere herein that reduce sensitivity. FIG. 4B illustrates the detection of induced gamma radiation using time delay. Times are as follows: $T_0$–$t_1$ time of irradiation; $t_2$–$T_1$ time of detection; and ($T_0$–$T_1$) total detection time For the existing technologies detection of secondary radiation is performed during the time of irradiation. This significantly decreases or defeats the ratio of signal to background.

The present invention allows the separation of irradiation and detection not only in time but also in space (thanks to time between irradiating and detecting). Time separation is indicated in FIG. 4 by the curve starting at time $T_2$ and ending at time $T_3$. This allows the exclusion of the main two components of background: the components of prompt secondary radiation is from the irradiated object and surroundings, and the components of "direct" radiation from the irradiating source. An additional advantage is that there is typically no need to protect to protect detector/s from "direct" radiation.

Figure 5:
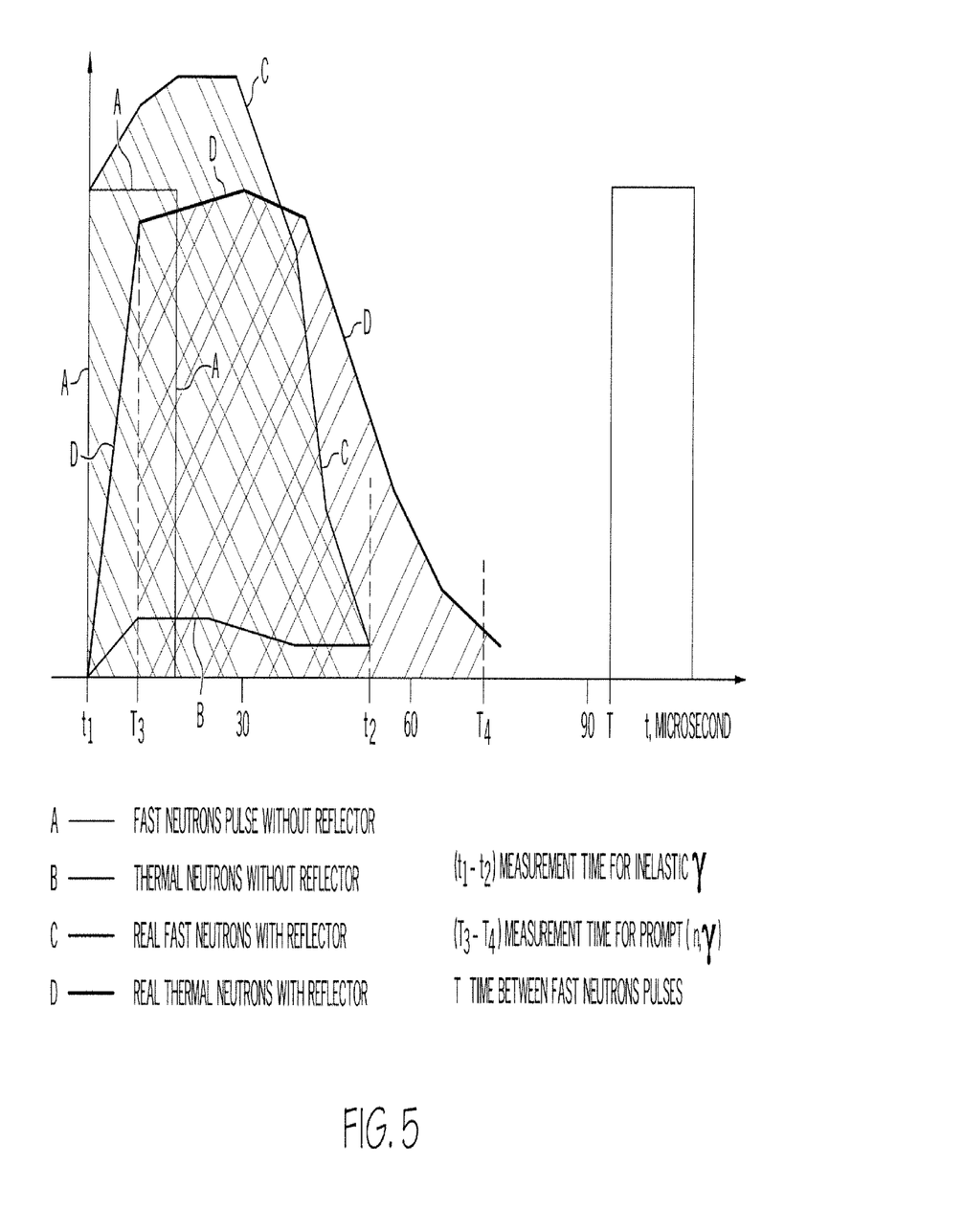
FIG. 5 is a time diagram for pulsed neutron technologies (PFNA, PFTNA, and Pelan). The vertical scale is in relative magnitude and the horizontal scale is time, t, in microseconds.

Referring now to FIG. 5, this figure illustrates attempts to increase the signal to background ratio by separating registration and irradiation using pulsed approaches (for existing technologies). However, because of nanoseconds differences in emitting secondary radiation (general law for these processes) there is always overlapping of irradiation and detection. For the present invention irradiation and detection can be fully separated in time. This applies for the condition where one or more elements exist that have a neutron reaction that produces induced radioactivity with acceptable half-time. Fortunately, for many materials to be detected and for some explosives elements such reactions exist and the present invention uses them (for instance, nitrogen N).

It is important to note that each natural or artificial radioactive element is characterized by unique half-life $T_{1/2}$. Therefore, such variables as $T_1$, $T_2$, $T_3$, ($T_0$-$T_1$), ($T_1$-$T_2$), ($T_2$-$T_3$), also uniquely depend on the sort of element. Manipulating with time intervals such as ($T_0$-$T_1$), ($T_1$-$T_2$), ($T_2$-$T_3$) permits optimization of detection and identification of different elements Referring again to FIG. 5, curve A represents fast neutrons without a reflector. Curve B represents thermal neutrons without a reflector. Curve C represents real fast neutrons with a reflector. Curve D represents real thermal neutrons with a reflector.

Figure 6:
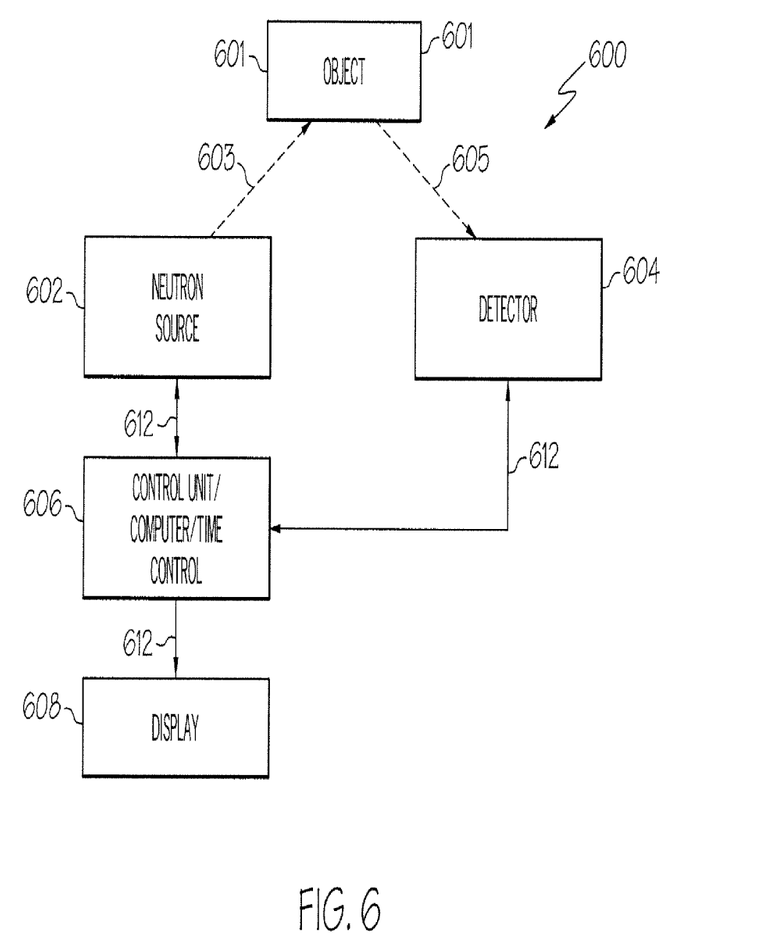
FIG. 6 is a schematic diagram of one preferred embodiment according to the invention.

Referring to FIG. 6, this figure is a schematic diagram showing a preferred apparatus according to one embodiment of the invention. The apparatus comprises a detection system 600. A neutron source 602 provides neutrons for irradiating an object 601 of interest neutrons 603. Detector 604 provides detection of gamma radiation 605 that is generated in the object 601 in response to irradiation with neutrons 603. The neutron source 602 and detector 604 are controlled by control unit/computer/time delay 606. Control unit/computer/time control 606 provides appropriately timed control signals to the neutron source 602 and detector 604 so that the advantages of the invention are obtained as discussed herein. Particularly important is the control of time so that there is an appropriate delay between irradiation and detection. Output from the neutron source 602 and detector 604 are used by controller unit/computer/time delay 606 to calculate the presence of a material of interest in the irradiated object 601. Display 608 provides a signal perceptible to a user of the absence or presence of the material of interest. The signal may be audible, visual, or vibrating, or a combination thereof. Communication between the various parts of the detection system 600 is provided by wired or wireless communication links 612.

The specific characteristics of this detection system are:
1. Better detection characteristics than currently developed neutron detection systems. These improvements are reached because of significantly higher signal to noise ratios by eliminating or decreasing components of the background to practically zero.

a. Device background. The main source of the background in all currently used devices (based both on fast and thermal neutrons technologies with the registration of the prompt secondary radiation) is "own devices background," It consists of all types of radiation initiated and triggered by the source (existing and used gamma detectors are sensitive both to the fast and thermal neutrons): direct neutron/gamma flux from source; scattered neutron flux from source; secondary prompt radiation caused by different types of neutron interaction with device parts, surroundings, etc. In many neutron devices such type of background creates more than 50-70% of the total detected background. In the herein disclosed fast neutron induced spectrometry technology such part of the background does not exist in principle because registration of the Secondary Delayed Induced Radiation (SDIR) is performed after the neutron source is turned off.

b. Content/surroundings background. The second part of the detector background in the existing technologies is caused by spectrum "cluttering" from the secondary prompt radiation from object content and is surroundings because of different reaction under neutron irradiation. There is no such background component in the presently disclosed fast neutron induced spectrometry technology. There is no input from the main content and surrounding elements in the energy interval that is used for explosives detection (for instance, for N of explosives 0.511 MeV) —Table 1, FIG. 1.

c. Energy overlapping component. Such component is significant for the most of the current systems. These other systems experience a large amount of both primary radiation and prompt secondary radiation because of many types of prompt neutron reaction and small differences in energy between different energy fines do not permit separating them even with high resolution detectors and very often demand special approaches (for instance, "time-of-flight", associated particle imaging) and decreasing the neutron output. There is no such problem for fast neutron induced spectrometry. Energy resolution even for the simplest gamma-rays spectrometers is about 5-6% for the energy 0.511 MeV. It corresponds to 0.03 MeV in the energy scale. There is not any element that has energy of induced radiation 0.511+0.06 MeV, so there is no overlapping of detector pulses that can cause incorrect detecting of background in the registered energy interval. See FIG. 1, bottom part.

d. Time overlapping component. Such overlapping is critical for all pulse neutron technologies. Currently used pulse fast neutron technologies use generators with output from $10^8$ to $10^{11}$ neutron per sec. Time of pulse is in the range 10 μses (excluding special approaches with nanosecond pulses) and frequency in the range of 10000 pulses per sec. For the existing detectors (taking into account size, efficiency of registration, and time resolution) it means that they can register (i.e. resolve energy separation) only approximately 1 γ-pulse for 1 neutron pulse of the neutron generator. This means that there is strong limitation in possible time of detection because increasing the neutron source output (neutron density in each pulse) can not decrease time of detection, and even worse, can worsen detection characteristics. Fast neutron induced spectrometry is substantially free from is these drawbacks because induced radioactivity is "post irradiation, delayed radioactivity" that depends only on integral neutron irradiating flux. So, it does not depend on the mode of the neutron generator, and even the simplest and cheapest continuous mode generators can be used without any limitation in output, i.e. time of detection can be decreased by increasing neutron source output without limitation of the generator output.

2. Better technical characteristics than currently developed systems. Better technical characteristics are ensured because of:

a. Requires only the simplest neutron sources. Induced activity depends only on integral neutron flux during irradiation process. The simplest neutron sources can be used because there are no additional requirements to the neutron source (pulses frequency, pulses duration, short-time and long time stability, etc.), that exist for other pulsed technologies, time-of-flight technologies, associated particle images technology, spectroscopy technology. And finally, there is no limitation on neutron output of a generator that exists for all mentioned above technologies. This means that one can always decrease time of checking an object, or enhance probability characteristics of detection by using neutron generators with higher output.

b. Requires only the simplest γ-rays spectrometers. There are no specific or strong requirements to γ-rays detectors. Because of wide intervals between energy of delayed induced radiation for all elements, there are no requirements for high energy and time resolution. Finally, it permits to use the cheapest detectors with large size that in it turn, increase efficiency of registration.

c. Utilizes the simplest detection technique and processing information. There are no stringent requirements to the geometry of the source and detectors as with the "time-of-flight" methodology or resonant angle methodologies. Both source/s and detector/s can be located close to the object, which in it turn, significantly increases the efficiency of using them because of decreased geometric attenuation. For example, there is geometric attenuation from both the distance associated with the source and the detector. Changes in distance due to the source cause variations in detection efficiency by $1/R^2$, and changes in distance due to the detector cause variations in detection efficiency by $1/r^2$. When r=R the efficiency attenuation varies by $1/R^4$. Thus the ability to locate the source and detector closer to the target object greatly increases detection characteristics or decreases detection time. For selected objects, conditions, and requirements a "4π" geometry can be configured, This means surrounding the object to be tested with detectors, i.e. maximizing the efficiency of detection of secondary radiation that is not possible with other methods.

d. There are no strong requirements for detectors time resolution capability as for all other technologies, particularly associated particle imaging (API) technology, "time-of-flight" technology, pulsed fast neutron analysis (PFNA) technology (PELAN—name of a device that uses pulsed elemental analysis with neutrons), fast neutron spectroscopy technology. By using continuous mode of neutron generator (for instance, density of neutrons in one pulse for integral output $10^8$ corresponds to $10^3$ neutrons per nsec, or $10^{12}$ neutrons per second (for frequency $10^4$ pulses per second (standard frequency for the most of generators. Spectrum of the prompt secondary radiation for such pulse neutrons density and separating signal from background can not be measured correctly by any of the existing detectors. Such limitation does not apply to the presently disclosed technology because the continuous mode neutron density for the generator with the same output will be only $10^8$ neutrons per sec, i.e. in 10,000 times less.

3. The technology can be employed as different types of devices with different detecting scenarios. It depends on the current application, tested object, and technical requirements. For instance:

a. For detecting explosives in suitcases, luggage, and break bulk and containerized cargo the best realization can consist of a conveyer technology with transporting the tested object from irradiating block (IB) to the detection block/s (DB) and irradiating the next object during measurement the first one. Such an approach decreases time of testing at least at two times.

b. For detecting/identification explosives in buried antitank mines it permits fast irradiating of suspicious regions/places by IB (neutron source) and then detecting irradiated locations by one or several DB (that can be even made as a small hand held devices)

c. For detecting explosives in UXO the same two-step technology (irradiating and then detecting) permits not only significantly increased throughput but also decreased size and mass of each block that is particularly important for urban conditions d. For detecting explosives in vehicles the technology can be realized as a small remote controlled robotic with IB and DB, or only with RB with several hand held DB The combination of the mentioned above device's features and characteristics can be summarized as the main device advantages:

1. Better detection characteristics than larger and more complex systems.
2. Better technical characteristics with simpler, easier maintenance, better mechanical and electrical reliability.
3. Smaller devices with less mass implying more portability than larger systems.
4. More flexibility in detection scenarios.
5. Significantly less price for manufacturing and services.
6. Flexibility and ways for enhancing parameters of detection for different applications. For instance, for detection explosives in stationary conditions (carry on, check in, break bulk and containerized cargo) it is possible to use device with one irradiation block and several registration blocks. Depending on requirements and actual number of tested objects, it permits at least two time increase throughput, or increasing reliability of detection/decreasing false alarms for the same throughput.

In another embodiment, depending on conditions and requirements, IB and DB could be combined as one device.

EXAMPLE 1

Technology for Suitcases, Luggage, Break Bulk Cargo

1. Detection of explosives is provided by registration of secondary delayed radiation induced in the nitrogen $N^{14}$ of explosives under irradiation by the fast neutron flux from compact neutron generator (CNG). For the first estimation the simplest and cheap compact neutron generator with output $10^9$ n/sec is used.
2. Registration of induced gamma-radiation from $N^{13}$ with energy 0.511 MeV follows $\beta^+$ decay caused by irradiation of $N^{14}$ by fast neutrons with energy 14 MeV, Conditions:
1. Detection of explosives in suitcases, boxes, and break bulk cargo (40×60×100 cm). Content: clothes, shoes, personal and household items, different supplies, CDs, DVDs, and VHS tapes, etc. Attenuation of the primary neutron flux does not exceed 1.5 (for such average content density ~1 g/cm$^3$, neutron macroscopic removal cross-section ~0.08-0.09 cm$^{-1}$). Attenuation of the secondary induced gamma-rays does not exceed 1.5 (linear macroscopic coefficient of attenuation of about 0.09 cm$^{-1}$).

2. Explosives: standard military explosives—hexogen, mass—1 kg.
3. Detectors: standard γ-ray spectrometric detector/s. Set (10) of the simplest and cheapest Na—I detectors with diameter 70 mm and height 70 mm; this corresponds to efficiency of registration $\epsilon$=0.5.
4. Explosive is located in the middle of the object (the worst case). So, distance from source to the explosives is 50 cm (irradiation from the opposite side. In principle, the technology permits the use of irradiation from the same side. It means that the distance could be significantly less –20 cm, i.e. primary neutron flux will be significantly higher, four times for the present case) and distance to detectors from explosives is 20 cm.
5. Time of irradiation 20 sec.
Is 6. Time of detection 20 sec.

Results:
Using (1), (2), (3) and (4) and the above described detection conditions, increment of detector reading is calculated because of the presence of explosives and the maximum of possible background is estimated that permits reception of reliable explosives detection with small rate of false alarms.

Calculating the increasing of the detector reading $\Delta S$ because of 1 kg explosives presence in the middle of the box (the worst detection conditions) with size 40×60×100 cm filled with miscellaneous and durable goods (the worst detection conditions), neutron source $10^9$ n/sec.; set of the 10 Na—I detectors with diameter 70 mm and height 70 mm; time of irradiation 20 sec and time of registration 20 sec gives the next value of increment of the signal (formulas (1) and (2)):

$$\Delta S \approx 120.$$

Reliability of Detection.

Reliability of detection 0.97 with false alarm 0.05 corresponds to the threshold of making decision for $$\Delta S \geq 5D,$$

where D is background standard deviation. For the above $\Delta S$, D=24, i.e. detector reading with absence of explosives (background B) could be up to 576 pulses. Because for the presently disclosed fast neutron induced spectrometry technology background B can not be so significant, any of the dependent detection conditions have to be decreased up to 10 times: output of the neutron source; time of irradiation, time of registration (or each of the last two in ~3 times), for the same reliability 0.97 and false alarms 0.05.

EXAMPLE 2

Even better results can be achieved by using the technology when physical parameters of the tested object content are known, predictable or limited, for instance explosives in UXO and buried antitank mines.

For instance:
1. Detecting explosives in UXO. The presence of only a metallic shell permits prediction of the energy distribution of the background radiation (Table 1, Iron and or Copper) and significantly increase ratio of signal to background by choosing substantially exact irradiating and detecting time and substantially exact energy diapason's for detecting signal (explosives element's) and background (shell elements).

Detecting of induced N and Fe, and discriminating Fe by simultaneous detection of other energy of induced Fe (0.117, 0.134) MeV and/or 0.845 MeV. There must be strong correlation between Fe secondary in the "signal" range and Fe secondary in the other range. The same situation with discriminating influence of Cu by simultaneous detecting of 1.17 MeV.

Applying the above calculation to UXO detection, it is determined that UXOs with calibers more than 90 mm can be tested for the presence of explosives in 30-60 sec.

Detecting explosives in buried mines. Chemical composition and physical parameters of soil and ground are known and they do not fluctuate significantly (Si, O, H, small concentration of C and N). It permits.

Applying the above calculation to buried mines detection, it is determined that all types of mines with metallic and nonmetallic shells and with explosives mass more than 1 Kg can be identified in 30-60 sec at a depth up to about 15 cm.

Note that the best practical solution consists in irradiating suspicious places/areas by the NG mounted on a small remote controlled robotic, and then detecting delayed secondary radiation from these places/areas by one or many hand-held detectors.

2. For stand alone objects or several types of improvised explosive devices (IEDs), results could be significantly better.

It is noted that the object to be tested may contain between about zero to about 100% of the material of interest in the detection process.

It is important to note that the technology can be extended for detecting/identification of chemical warfare agents, toxic chemicals (for example in foodstuff), or drugs. For example the same approach can be applied to detecting chemical warfare agents by registering delayed induced radiation with the unique half-period for each element from the main elements in the warfare agent such as: F, Cl, P, S, As.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

I claim:

1. An apparatus for detecting a material containing at least one element of interest and at least one masking element in an object comprising:
    a. an irradiation site and a neutron generator for irradiating the object;
    b. a plurality of distinct detection sites remote from the irradiation site, each of the plurality of detections sites including a detector for measuring induced γ-rays emitted by the irradiated object from energy state relaxation as a result of neutron capture; and
    c. a controller for controlling the neutron generator and the detector, the controller including a timer for controlling a measurement event in the detection site, with the controller being configured to initiate measuring, by the detector, of induced γ-rays emitted by the irradiated object at a predetermined period of time after irradiating the object based on at least one masking element's decay rate of induced γ-rays and at least one element of interest's decay rate of induced γ-rays and to cause a comparison of energy line strength ratios of at least one masking element's induced γ-rays to calculate an amount of induced γ-rays emitted by the at least one masking element at an energy line of interest associated with the at least one element of interest.

2. The apparatus according to claim 1, wherein the apparatus comprises:
    d. a display for indicating to a user the absence or presence of the element of interest in the object.

3. An apparatus for detecting a material containing at least one element of interest and at least one masking element in an object comprising:
    a. an irradiation site and a neutron generator for irradiating the object;
    b. a detection site including a detector for measuring induced γ-rays emitted by the irradiated object from energy state relaxation as a result of neutron capture;
    c. a controller for controlling the neutron generator and the detector, the controller including a timer for controlling a measurement event in the detection site, with the controller being configured to initiate measuring, by the detector, of induced γ-rays emitted by the irradiated object at a predetermined period of time after irradiating the object based on at least one masking element's decay rate of induced γ-rays and at least one element of interest's decay rate of induced γ-rays and to cause a comparison of energy line strength ratios of at least one masking element's induced γ-rays to calculate an amount of induced γ-rays emitted by the at least one masking element at an energy line of interest associated with the at least one element of interest; and
    a conveyor in communication with the control unit for moving the object from the irradiation site to the detection site, wherein the detection site is remote from the irradiation site.

4. A method for detecting contraband containing at least one element of interest and at least one masking element comprising:
    a. irradiating a first object with neutrons at an irradiation site to produce a first irradiated object;
    b. moving the first irradiated object from the irradiation site to a first detection area and then measuring, at the first detection area, induced γ-rays emitted by the first irradiated object from energy state relaxation as a result of neutron capture after a predetermined time delay following irradiating of the first object with neutrons, wherein the predetermined time delay is selected based on at least one masking element's decay rate of induced γ-rays and at least one element of interest's decay rate of induced γ-rays;
    c. using energy line strength ratios of at least one masking element's induced γ-rays to calculate an amount of induced γ-rays emitted by the at least one masking element at an energy line of interest associated with the at least one element of interest; and
    d. determining if the measured induced γ-rays emitted by the first irradiated object are indicative of contraband.

5. The method according to claim 4, comprising:
    e. alerting an operator to the presence of contraband.

6. The method according to claim 4, wherein the step of irradiating the first object also includes irradiating a second object with neutrons at the irradiation site to produce a second irradiated object; and the method further comprises:
    moving the second irradiated object from the irradiation site to a second detection area distinct from the first detection area;
    measuring, at the second detection area, induced γ-rays emitted by the second irradiated object from energy state relaxation as a result of neutron capture after a predetermined time delay following irradiating of the second object with neutrons, wherein the predetermined time delay is selected based on at least one masking element's decay rate of induced γ-rays and at least one element of interest's decay rate of induced γ-rays; and
    determining if the measured γ-rays emitted by the second irradiated object are indicative of contraband.

7. The method according to claim 4, wherein the step of determining if the measured induced γ-rays emitted by the first irradiated object are indicative of contraband includes detecting the presence of nitrogen.

8. The method according to claim 7, wherein the at least one masking element is selected from the group consisting of copper and iron.

9. The method according to claim 4, further comprising:
   irradiating a second object with neutrons to produce a second irradiated object while simultaneously performing the step of measuring induced γ-rays emitted by the first irradiated object.

* * * * *